Patented July 29, 1930

1,771,895

UNITED STATES PATENT OFFICE

VEADER LEONARD, OF BALTIMORE, MARYLAND, ASSIGNOR TO SHARP & DOHME, INC., OF BALTIMORE, MARYLAND, A CORPORATION OF NEW JERSEY

ANTISEPTIC COMPOSITION

No Drawing. Application filed January 19, 1928. Serial No. 248,009.

This invention relates to antiseptic compositions which are valuable as general antiseptics.

The new antiseptic compositions are solutions of hexyl resorcinol, in solvents made up of a mixture of glycerine and water.

It is known that the hexyl resorcinol possesses marked germicidal properties, but is of limited solubility in water.

Hexyl resorcinol is soluble in vegetable and animal oils. A solution of hexyl resorcinol in olive oil, for example, has been largely used for internal administration. Such olive oil solutions however, are not suitable for general antiseptics. The oil solution, because of its inability to mix with aqueous tissue fluids, does not diffuse over tissue surfaces.

Hexyl resorcinol is also soluble in organic solvents such as alcohol, ether and chloroform, but solutions in such solvents are very irritating, and the hexyl resorcinol is apt to be precipitated by dilution with the tissue fluids.

I have found that the latent bactericidal power of hexyl resorcinol can be rendered available so that it may be successfully employed as a general antiseptic for tissue surfaces and the like, and without appreciable irritant effect upon such surfaces, by dissolving the hexyl resorcinol in a mixture of glycerine and water. Such solutions can readily be prepared of adequate concentration for prompt germicidal action, and do not precipitate the hexyl resorcinol when applied to tissue surfaces and diluted with tissue fluids, and such solutions are relatively stable in the presence of standard organic mixtures.

The proportions of the water and glycerine employed in the solvents can be somewhat varied, as well as the amount of hexyl resorcinol dissolved therein. A solution which is particularly advantageous as a general antiseptic is one containing about 1 milligram of crystalline hexyl resorcinol per cubic centimetre dissolved in a solvent made up of about 30% glycerine and 70% water.

Such a solution of hexyl resorcinol possesses many valuable properties. It is stable, non-toxic and non-irritating. It is highly penetrating when applied to tissue surfaces, such as the skin, mucous membranes, denuded areas, wounds, etc. It is a powerful astringent. It retains its activity in the presence of organic matter. It is a clear, odorless solution and does not attack heavy metals. It retains its bactericidal power in all dilutions likely to be encountered in its application as an antiseptic, as well as in the presence of organic matter. It destroys the major types of pathogenic micro-organisms in less than fifteen seconds time.

The high activity of the solution appears to be due largely to its low surface tension. Water and glycerine both have high surface tensions, and the addition of water to glycerine raises the surface tension. Hexyl resorcinol is difficultly soluble in water, but it exerts a remarkable lowering of the surface tension of the water to which it is added. Hexyl resorcinol is readily soluble in glycerine, but it reduces the surface tension of the glycerine to only a small extent. I have found, however, that the presence of water in the glycerine in which the hexyl resorcinol is dissolved results in reducing the surface tension of the solution to a remarkable extent, and that this reduction in surface tension increases with increase in percentage of water added to the glycerine up to a minimum of around 37 dynes per centimetre when 70% of water is admixed with 30% of glycerine, in a case of a 1 to 1000 solution of hexyl resorcinol. If the glycerine is decreased too much, the hexyl resorcinol does not remain in solution, but with about 30% of glycerine the hexyl resorcinol is retained in solution even when the solution is further diluted with water.

Such a solution, containing one part of hexyl resorcinol per thousand parts of solution, and containing about 30% of glycerine and 70% of water, may be used full strength for external application on the skin, on fresh cuts and abrasions, on granulating surfaces and in abscess cavities. It may also be employed full strength in topical applications or sprays in the ear, nose, throat and mouth. For some purposes, it may advantageously be diluted with one or two parts of water, while for irrigating tissue surfaces in which a considerable bulk of fluid is essential, and also as a wet dressing on infected wounds and denuded surfaces, a dilution with five parts of water may be employed.

I claim:

1. An antiseptic composition comprising a solution of hexyl resorcinol in aqueous glycerine.

2. An antiseptic composition comprising a solution of hexyl resorcinol in a solvent made up of about 30% glycerine and 70% water, such solution containing about one milligram of hexyl resorcinol per cubic centimetre.

In testimony whereof I affix my signature.

VEADER LEONARD.